(12) United States Patent
Quesnel

(10) Patent No.: US 9,748,670 B1
(45) Date of Patent: Aug. 29, 2017

(54) CONDUCTOR CONNECTOR ACCESSORIES AND METHODS FOR CONNECTING CONDUCTORS TO CONDUCTOR CONNECTOR ACCESSORIES

(71) Applicant: AFL Telecommunications LLC, Duncan, SC (US)

(72) Inventor: Wayne Quesnel, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/366,151

(22) Filed: Dec. 1, 2016

(51) Int. Cl.
*H01R 4/20* (2006.01)
*H01R 13/03* (2006.01)

(52) U.S. Cl.
CPC ............ *H01R 4/203* (2013.01); *H01R 13/03* (2013.01)

(58) Field of Classification Search
CPC ........... H01R 4/203; H01R 4/20; H01R 4/206
USPC ........................................ 439/877; 174/84 C
See application file for complete search history.

(56) References Cited

U.S. PATENT DOCUMENTS

| | | | | |
|---|---|---|---|---|
| 6,015,953 A * | 1/2000 | Tosaka | ................ | H01R 4/20 174/79 |
| 6,805,596 B2 * | 10/2004 | Quesnel | ................ | H01R 11/09 174/84 C |
| 7,019,217 B2 * | 3/2006 | Bryant | ................ | H01R 4/5083 174/88 R |
| 7,311,553 B2 * | 12/2007 | Tamm | ................ | H01R 4/20 439/584 |
| 7,342,175 B2 * | 3/2008 | De France | ................ | H01R 4/5025 174/84 R |
| 7,348,489 B2 * | 3/2008 | Chadbourne | ................ | H01R 4/62 174/74 R |
| 7,385,138 B2 * | 6/2008 | De France | ................ | H01R 4/5025 174/84 R |
| 7,407,411 B2 * | 8/2008 | Byrne | ................ | H01R 13/5804 174/74 R |
| 7,563,983 B2 * | 7/2009 | Bryant | ................ | H02G 7/04 174/74 R |
| 7,575,485 B2 * | 8/2009 | Waltz | ................ | H01R 4/20 174/74 R |
| 7,607,954 B2 * | 10/2009 | Byrne | ................ | H01R 13/5804 174/74 R |
| 7,608,783 B2 * | 10/2009 | Bryant | ................ | H01R 4/5083 174/88 R |
| 7,708,606 B2 * | 5/2010 | Waltz | ................ | H01R 4/20 174/74 R |
| 7,882,629 B2 * | 2/2011 | Chadbourne | ................ | H01R 4/62 174/79 |
| 8,022,301 B2 * | 9/2011 | Bryant | ................ | H01R 4/5083 174/74 R |
| 8,167,665 B2 * | 5/2012 | De France | ................ | H01R 4/20 439/783 |

(Continued)

*Primary Examiner* — Ross Gushi
(74) *Attorney, Agent, or Firm* — Dority & Manning, P.A.

(57) ABSTRACT

A method for connecting a conductor and a conductor connector accessory includes inserting an end portion of the conductor into an interior of a tube, and inserting the tube into an interior of a barrel. The barrel defines a plurality of radial passages extending between an outer surface of the barrel and the interior of the barrel. The method further includes providing a plurality of lobes, each of the plurality of lobes disposed within one of the plurality of passages. The method further includes inserting the barrel into an interior of an outer shell, and compressing the outer shell, barrel, lobes, tube and end portion together.

19 Claims, 5 Drawing Sheets

(56) References Cited

U.S. PATENT DOCUMENTS

| | | | | |
|---|---|---|---|---|
| 8,777,679 | B2* | 7/2014 | De France | H01R 4/20 |
| | | | | 439/879 |
| 8,895,856 | B2* | 11/2014 | McCullough | F16G 11/02 |
| | | | | 174/75 R |
| 9,166,303 | B2* | 10/2015 | Khansa | H01R 4/188 |
| 9,257,760 | B2* | 2/2016 | Crutcher | H01R 4/5025 |
| 9,385,449 | B2* | 7/2016 | Peters | H01R 4/203 |
| 9,397,461 | B2* | 7/2016 | De France | H01R 43/048 |
| 2004/0132366 | A1* | 7/2004 | Hiel | B32B 15/04 |
| | | | | 442/43 |
| 2008/0072991 | A1* | 3/2008 | Tamm | H01R 4/20 |
| | | | | 140/150 |
| 2011/0297441 | A1* | 12/2011 | Quesnel | H02G 7/056 |
| | | | | 174/84 C |
| 2015/0075837 | A1* | 3/2015 | Welborn | H01R 43/20 |
| | | | | 174/90 |

* cited by examiner

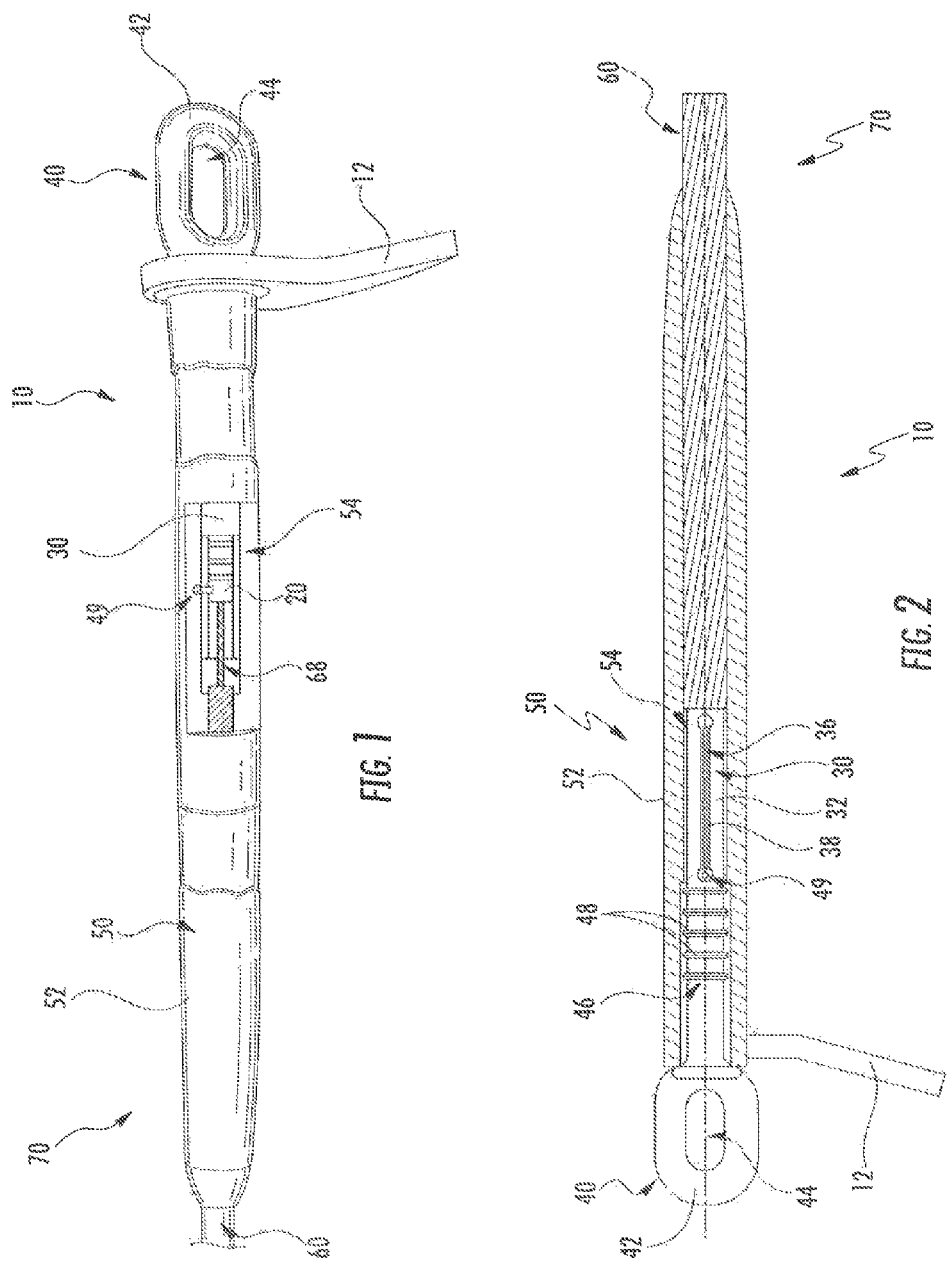

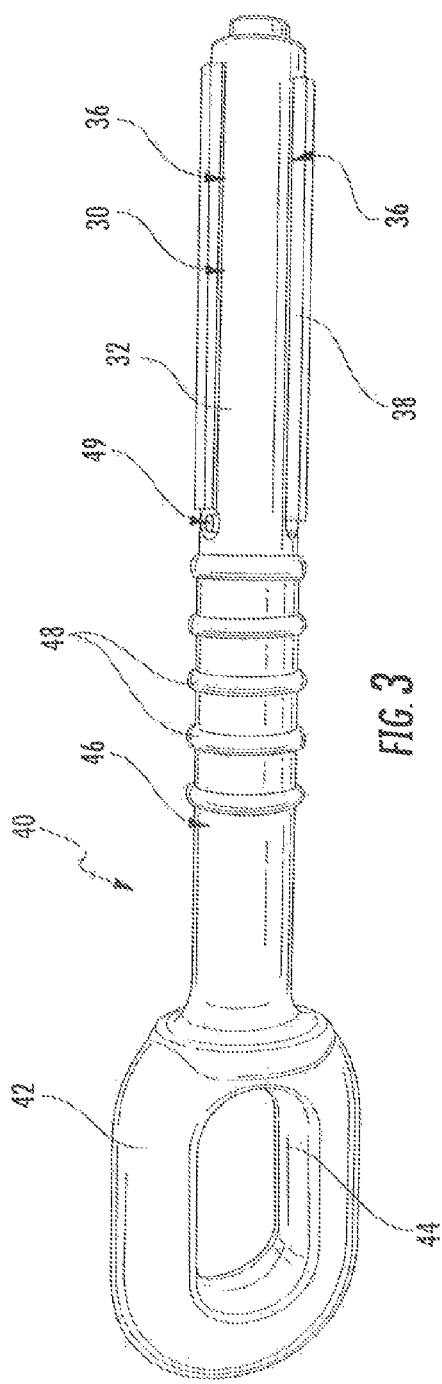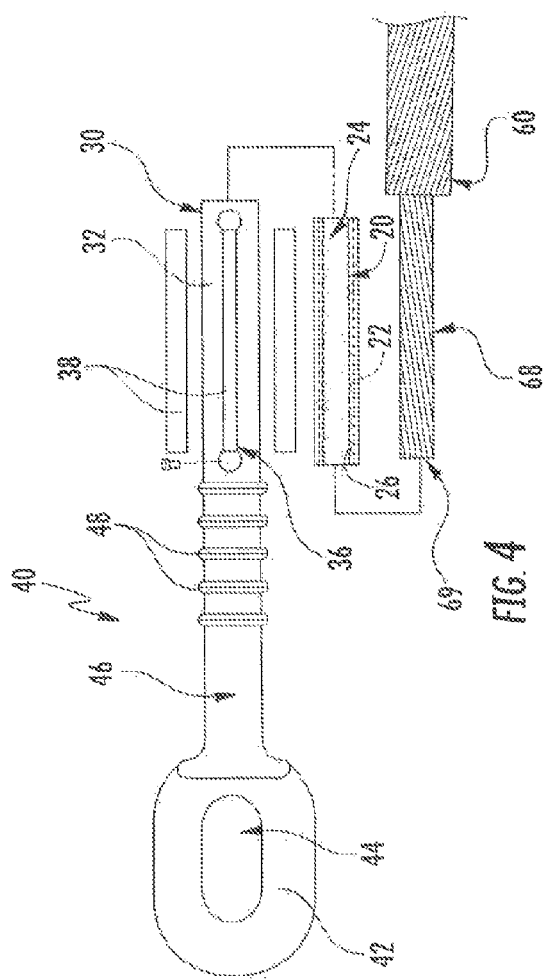

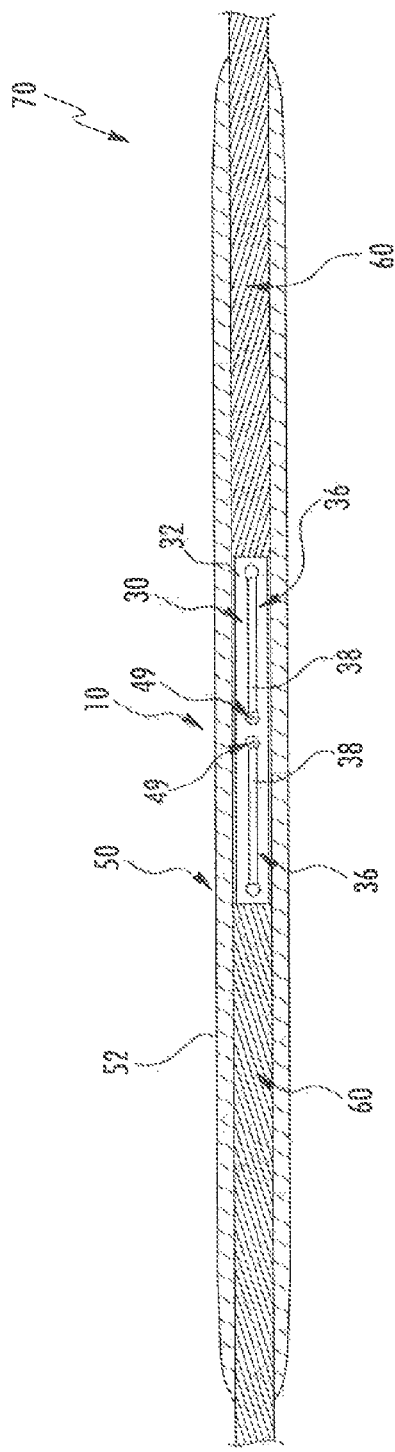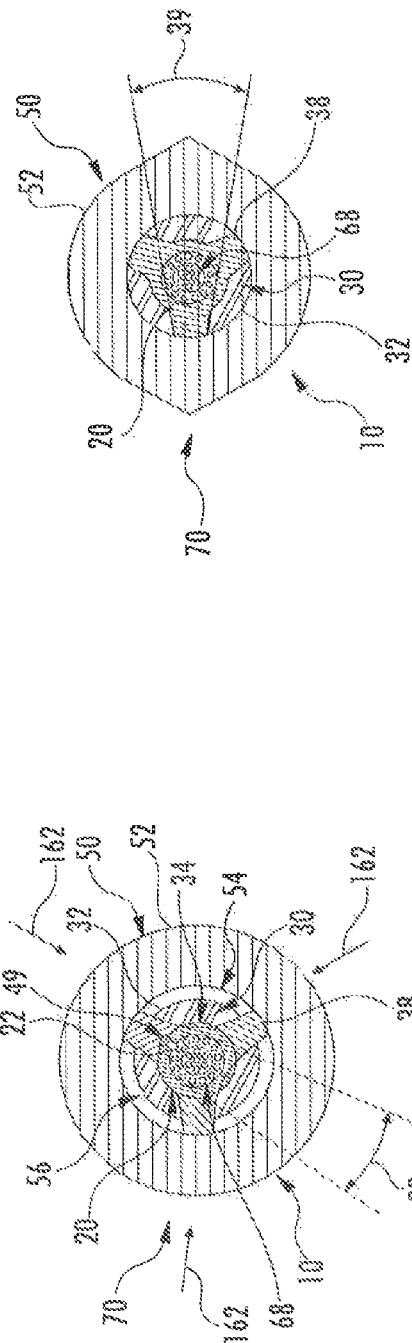

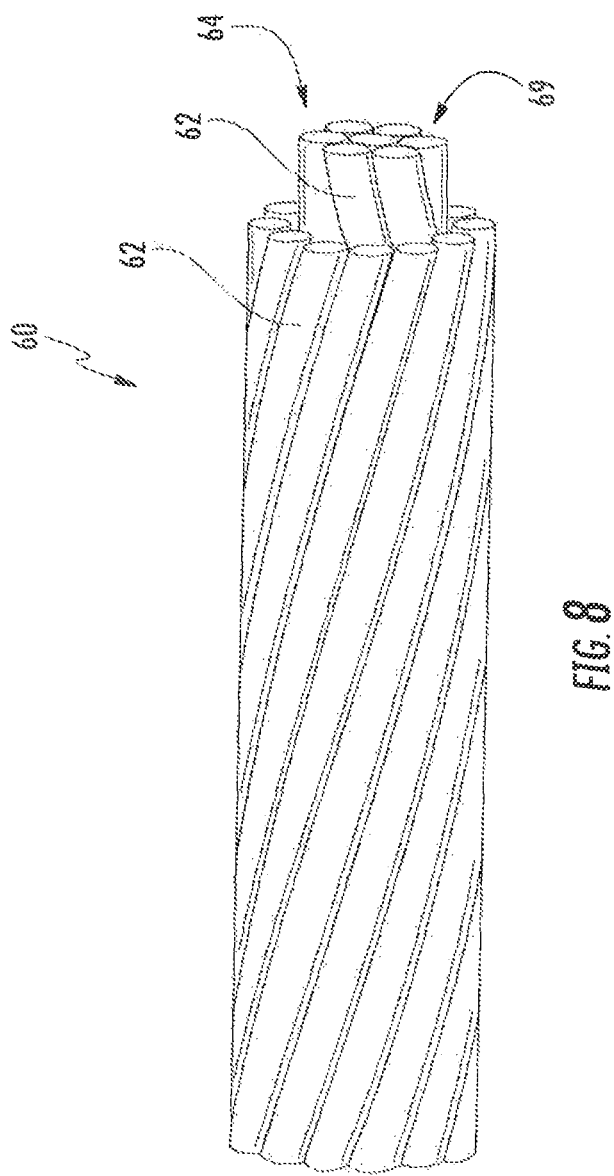

CONDUCTOR CONNECTOR ACCESSORIES AND METHODS FOR CONNECTING CONDUCTORS TO CONDUCTOR CONNECTOR ACCESSORIES

FIELD

The present disclosure relates generally to conductor connector accessories assemblies which include conductor connector accessories such as dead ends or splices, and to methods for connecting conductors to conductor connector accessories.

BACKGROUND

Conductors are utilized in a variety of environments for carrying electrical current and generally facilitating the transmission of electricity. Conductor connector accessories are utilized to connect the conductors to other conductors or to other components of the energy transmission assembly such as other conductor connector accessories or the tower. Examples of conductor connector accessories include dead ends, splices, terminals, repair sleeves, t-taps, t-connectors, jumper connectors, etc.

In many cases, the conductors are installed in relatively high tension. Due to the relatively high tension environments, it is desirable for the connection between a conductor connector accessory and conductor to be robust, thereby preventing relative movement between the conductor and conductor connector accessory and/or disconnection of the conductor from the conductor connector accessory.

In some cases, compressive forces have been utilized to connect conductors and conductor connector accessories via a compressed interface. Swaging is one example of a compressive technique for connect conductors and conductor connector accessories. However, known methods and apparatus for compressively connecting conductors and conductor connector accessories typically require multiple separate compression steps. This results in significant time and effort being spent on the connection of such conductors and conductor connector accessories, which can be considered costly and inefficient.

Additionally, in many cases, the conductor connector accessories are utilized in high temperature applications. As a result, the accessories themselves are subjected to high temperatures, and can be damaged or underperform as a result of such exposure.

Accordingly, improved conductor connector accessories and methods for connecting conductor connector accessories and conductors together are desired. In particular, accessories and methods which can be efficiently completed using compressive techniques and which provide improved high temperature performance would be advantageous.

BRIEF DESCRIPTION

Aspects and advantages of the invention will be set forth in part in the following description, or may be obvious from the description, or may be learned through practice of the invention.

In accordance with one embodiment of the present disclosure, a conductor connector accessory is provided. The conductor connector accessory includes a tube which includes an interior surface defining an interior. A grit coating is disposed on an inner surface of the tube. The conductor connector accessory further includes a barrel defining an interior and surrounding the tube. The barrel defines a plurality of radial passages extending between an outer surface of the barrel and the interior of the barrel. The conductor connector accessory further includes a plurality of lobes, each of the plurality of lobes disposed within one of the plurality of passages and in contact with tube. The conductor connector accessory further includes an outer shell defining an interior and surrounding the barrel.

In accordance with another embodiment of the present disclosure, a method for connecting a conductor and a conductor connector accessory is provided. The method includes inserting an end portion of the conductor into an interior of a tube, and inserting the tube into an interior of a barrel. The barrel defines a plurality of radial passages extending between an outer surface of the barrel and the interior of the barrel. The method further includes providing a plurality of lobes, each of the plurality of lobes disposed within one of the plurality of passages. The method further includes inserting the barrel into an interior of an outer shell, and compressing the outer shell, barrel, lobes, tube and end portion together.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective partial cross-sectional view of a conductor connector accessory assembly in accordance with one embodiment of the present disclosure;

FIG. 2 is a side cross-sectional view of a conductor connector accessory assembly in accordance with one embodiment of the present disclosure;

FIG. 3 is a perspective view of a component of a conductor connector accessory assembly in accordance with one embodiment of the present disclosure;

FIG. 4 is a side exploded view of components of a conductor connector accessory assembly in accordance with one embodiment of the present disclosure;

FIG. 5 is a side cross-sectional view of a conductor connector accessory assembly in accordance with one embodiment of the present disclosure;

FIG. 6 is a front cross-sectional view of a conductor connector accessory assembly in an uncompressed state in accordance with one embodiment of the present disclosure;

FIG. 7 is a front cross-sectional view of a conductor connector accessory assembly in a compressed state in accordance with one embodiment of the present disclosure;

FIG. 8 is a perspective view of a conductor in accordance with one embodiment of the present disclosure.

DETAILED DESCRIPTION

Figure 9:
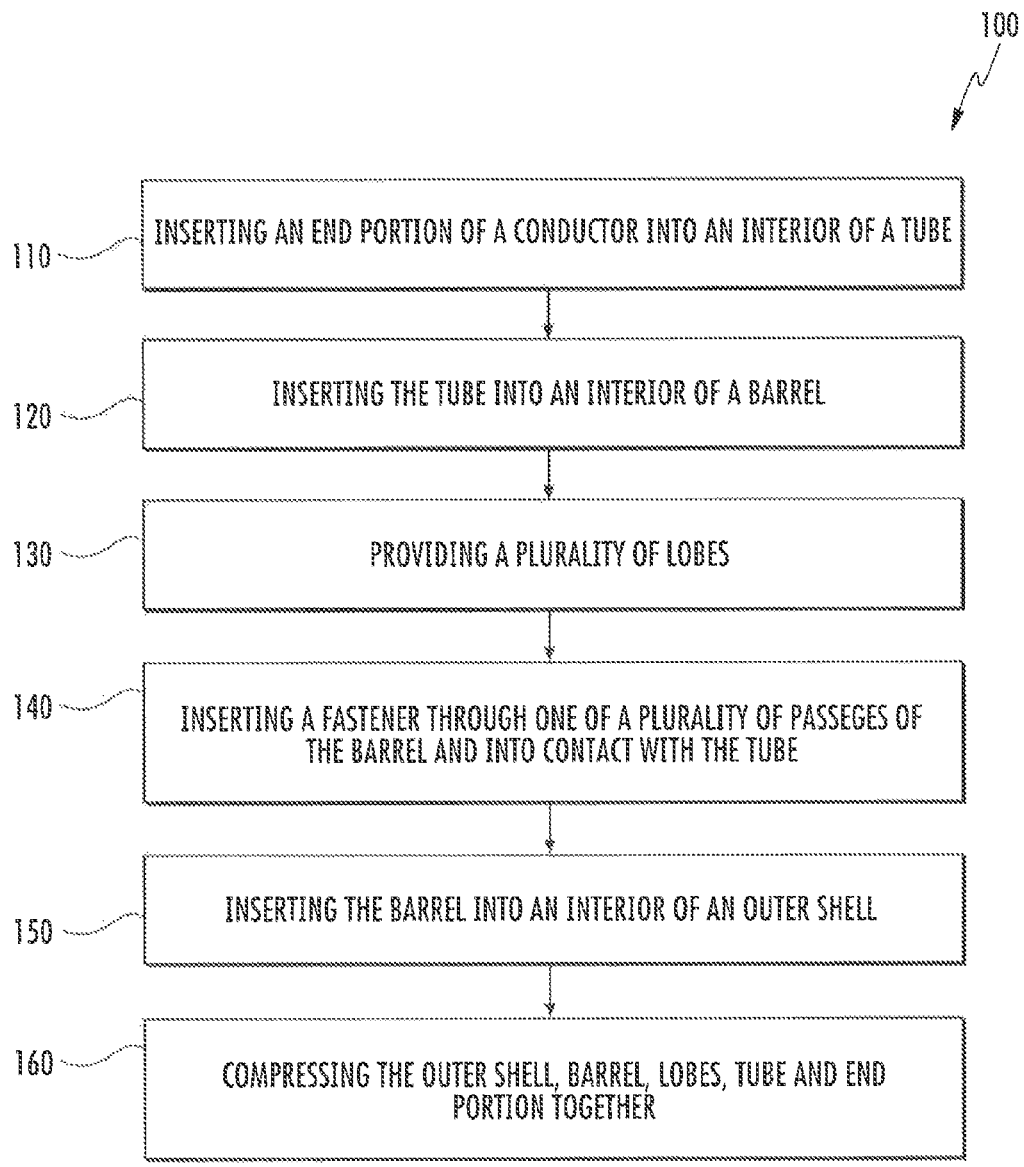
FIG. 9 is a flow chart illustrating a method for connecting a conductor and a conductor connector accessory in accordance with embodiments of the present disclosure.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure relates generally to conductor connector accessory assemblies and methods for connecting conductors and conductor connector accessories together. Assemblies and methods in accordance with the present disclosure advantageously facilitate improved connections between the conductors and conductor connector accessories. Further, assemblies and methods in accordance with the present disclosure are advantageously efficiently formed and performed, with only a single step of compression using a single die required. Still further, assemblies formed in accordance with the present disclosure may advantageously provide improved operation in high temperature environments, such as environments above 93 degrees Celsius and in some cases up to or above 250 degrees Celsius.

In exemplary embodiments, conductor connector accessories and assemblies in accordance with the present disclosure are utilized with aluminum conductor steel supported ("ACSS") conductors. Alternatively, however, any suitable conductors may be utilized. Examples of suitable conductor connector accessories include, for example, dead ends, splices, terminals, repair sleeves, t-taps, t-connectors, jumper connectors, and other suitable connector accessories for connecting conductors to other conductors or to other components of an energy transmission assembly such as other conductor connector accessories or a tower.

Referring now to FIGS. 1 through 7, embodiments of conductor connector accessories 10 in accordance with the present disclosure are provided. FIGS. 1 through 4 illustrate embodiments wherein the conductor connector accessory 10 is or includes a dead end. FIG. 5 illustrates embodiments wherein the conductor connector accessory 10 is a splice. In some embodiments, additional conductor connector accessories 10 may be coupled to the conductor connector accessory 10. For example, a terminal may be connected to a dead end via a bolted connection to a tongue 12 of the dead end. The dead end and terminal may both be connected to conductors.

A conductor connector accessory 10 in accordance with the present disclosure may include one or more tubes 20. Each tube 20 may include an inner surface 22 that defines an interior 24 of the tube 20. In exemplary embodiments, each tube 20 may be formed from a first material such as an aluminum, although in alternative embodiments other suitable materials such as other suitable metals may be utilized. A tube 20 may be sized to accommodate within the interior 24 an end portion 68 (which includes an end 69) of a conductor 60, as discussed herein. During assembly, the end portion 68 may be inserted into the interior 24 such that the tube 20 surrounds the end portion 68. In exemplary embodiments, the end portion 68 includes only a portion of the core 64 of the conductor 60, as discussed herein, with outer layers of the conductor 60 having been cut back.

In exemplary embodiments, a grit coating 26 may be provided. The grit coating 26 may be disposed on the inner surface 22 of a tube 20, and may facilitate improved gripping of the tube 20 and conductor connector accessory 10 generally on the conductor. The grit coating 26 may include a plurality of particles, such as in exemplary embodiments silicon carbide particles. The grit coating 26 may further include a varnish or other suitable adhesive in which the particles may be embedded, and which may provide a connection between the particles and the inner surface 22. When the end portion 68 of a conductor 60 is disposed within the interior 24 of a tube 20, the end portion 68 may thus contact the grit coating 26.

An accessory 10 may further include one or more barrels 30. A barrel 30 may include an outer surface 32 and an inner surface which defines an interior 34. Further, barrel 30 may include a plurality of radially extending passages 36 extending between the outer surface 32 and the interior 34. The passages 36 may, for example, be disposed in one or more generally annular arrays about the interior 34. In exemplary embodiments as shown in FIGS. 3, 4, 6 and 7, three passages 36 may be defined in a single annular array. Alternatively, two, four or more passages 36 may be defined in a single annular array. Further, in some embodiments as illustrated in FIG. 5, multiple annular arrays, such as two annular arrays as shown, of passage 36 may be defined. In exemplary embodiments, each barrel 30 may be formed from a second material different than the first material such as a steel, although in alternative embodiments other suitable materials such as other suitable metals may be utilized. A barrel 30 may be sized to accommodate within the interior 34 a tube 20 (in which an end portion 68 of a conductor 60 is disposed). During assembly, tubes 20 and associated end portions 68 may be inserted, such as fully inserted, into the interior 34 such that the barrel 30 surrounds the tube(s) 20. FIGS. 2 through 4 illustrate embodiments wherein a single tube 20 is inserted into the interior of a barrel 30. FIG. 5 illustrates embodiments wherein multiple tubes, as an in exemplary embodiments two tubes 20, are inserted into the interior of a barrel 30.

A plurality of lobes 38 may additionally be provided. Each lobe 38 may be disposed within one of the plurality of passages 36, and may thus extend into the interior 34. When assembled, i.e. when an associated tube 20 is disposed within the interior 34 of a barrel 30, the lobes 38 may contact the tube 20 (i.e. an outer surface thereof). In exemplary embodiments, each lobe 38 may be formed from a first material such as an aluminum, although in alternative embodiments other suitable materials such as other suitable metals may be utilized.

In exemplary embodiments, each lobe 38 may have a wedge-shaped cross-sectional profile (i.e. when viewed in a front cross-sectional view as illustrated in FIGS. 6 and 7). In exemplary embodiments, a wedge angle 39 of between 5 degrees and 40 degrees, such as between 10 degrees and 30 degrees, such as between 15 degrees and 25 degrees, such as 20 degrees, may be defined for each lobe 38. Such wedge angles 39 are advantageous as they facilitate capture of the lobes 38 within the passages 36. In exemplary embodiments wherein the lobes 38 are formed from a material, such as aluminum, that is different from the material of the barrel 30, these materials may have different expansion rates. For example, the first material (such as aluminum) may expand faster than the second material (such as steel) at high temperatures as discussed herein. Because the lobes 38 are captured by virtue of the wedge angles 39, such expansion occurs generally radially inward, thus increasing the grip on the tube 20 and conductor 60 therein.

Further, in exemplary embodiments when in an uncompressed state as illustrated in FIG. 6, a total cross-sectional surface area (i.e. when viewed in a front cross-sectional view as illustrated in FIGS. 6 and 7) of the lobes 38 may be greater than or equal to a total cross-sectional gap area 56 (at the same cross-section) between barrel 30 and an outer shell 50 as discussed herein.

In some embodiments as shown in FIG. 5, barrel 30 may be a stand-alone component. Alternatively, barrel 30 may, in some embodiments as illustrated in FIGS. 2 through 4, be a component of a sub-assembly that is utilized in the accessory 10. For example, barrel 30 may be a component of a dead end core 40. The dead end core 40 may, for example, include the barrel 30 and an eye 42. Eye 42 may include an aperture 44 defined therethrough. Barrel 30 may, in some embodiments, extend from an end of the eye 42. Alternatively, as illustrated, dead end core 40 may further include an intermediate portion 46 disposed between and connecting the eye 42 and barrel 30. In some embodiments as shown, intermediate portion 46 may be a corrugated portion which includes a plurality of outer ridges or corrugations 48. In exemplary embodiments, each dead end core 40 or other sub-assembly may be formed from a second material different than the first material such as a steel, although in alternative embodiments other suitable materials such as other suitable metals may be utilized. Further, in exemplary embodiments, a dead end core 40 or other sub-assembly in accordance with the present disclosure may be an integrally formed part, with the components thereof formed as a single, unitary structure.

In some embodiments, one or more fasteners 49, such as rivets, self-tapping screws, pins, or other suitable mechanical fasteners, may be provided in accessory 10. Each fastener 49 may be inserted through one of the plurality of the passages 46 and into contact with a tube 20 inserted therein. In some embodiments, fastener 49 may merely contact an outer surface of the tube 20, while in other embodiments fastener 49 may extend into and/or through the tube 20 into the interior thereof. Fastener 49 may, by being partially positioned within a passage 36 and in contact with the tube 20, limit or prevent rotation of the tube 20 within the barrel 30 and prevent removal of the tube 20 from the barrel 30.

A conductor connector accessory 10 in accordance with the present disclosure may further include an outer shell 50. The outer shell 50 may include an outer surface 52 and an inner surface that defines an interior 54 of the outer shell 50. The outer shell 50 may be the radially outer-most component of the accessory 10, and the outer surface 52 may be a radially outer-most surface of the accessory 10. In embodiments wherein the accessory 10 includes a tongue 12, the tongue 12 may be a component of the outer shell 50, as shown in FIGS. 1 and 2. In exemplary embodiments, the outer shell 50 may be formed from a first material such as an aluminum, although in alternative embodiments other suitable materials such as other suitable metals may be utilized. Further, in exemplary embodiments, an outer shell 50 (including components thereof such as a tongue 12) in accordance with the present disclosure may be an integrally formed part, with the components thereof formed as a single, unitary structure. Outer shell 50 may be sized to accommodate within the interior 54 a barrel 30, as discussed herein. During assembly, the barrel 30 may be inserted into the interior 54 such that the outer shell 50 surrounds the barrel 30.

A conductor connector accessory 10 in accordance with the present disclosure is a component of a conductor connector accessory assembly 70 which includes the accessory 10 and one or more conductors 60. In general, any suitable conductors 60 may be connected to conductor connector accessories 10 in accordance with the present disclosure. In exemplary embodiments, for example, a conductor 60 in accordance with the present disclosure is an ACSS conductor.

A conductor 60 may, for example, include a plurality of conductor strands 62 which are arranged in one or more generally concentric layers. For example, in some embodiments as shown, a conductor 60 may include seven conductor strands 62 which form a core 64 of the conductor 60, with a central strand 62 surrounded by a layer of six strands 62. One or more additional layers of strands may surround the core layers. The total number of strands in a conductor 60 may, for example, be 26, 45, 54, 84, etc. In some embodiments, the outer strands (outside the core) may have circular cross-sections, while in other embodiments the outer strands may have other suitable cross-sectional shapes such as trapezoids. One or more layers, such as the layer of six strands 62 surrounding the central strand 62, may have a helical arrangement, with each strand 62 extending helically about a longitudinal axis of the conductor 60.

In exemplary embodiments, the conductor strands 62 of conductor 60 are formed from one or more metals. For example, in some embodiments, each conductor strand 62 is formed from a steel and/or an aluminum. For example, in exemplary embodiments as illustrated in FIG. 8, each conductor strand 62 of the core 64 is formed from steel and each conductor strand 62 of the layer(s) surrounding the core 64 is formed from aluminum.

As discussed, the various components of an accessory 10 in accordance with the present disclosure are formed from various materials. For example, some components, such as the tube 20, lobes 38, and outer shell 50 may be formed from a first material, which in exemplary embodiments may be an aluminum. Other components, such as the barrel 30 (and in some embodiments the dead end core 40 or other assembly which includes the barrel 30) may be formed from a second material that is different from the first material, such as in exemplary embodiments a steel. Such difference in materials in such exemplary embodiments may advantageously allow the accessory to have improved performance in high temperature environments, such as in environments above 93 degrees Celsius and in some cases up to or above 250 degrees Celsius. For example, the second material, which in exemplary embodiments may be a steel, may act as a heat sink during operation. This advantageously reduces or prevents overheating of the other components during operation, thus resulting in improved performance of the accessory 10 generally.

Referring now to FIGS. 1 through 7 and 9, methods 100 for connecting one or more conductors 60 and a conductor connector accessory 10 are provided in accordance with the present disclosure. A method 100 may include, for example, the step 110 of inserting an end portion 68 of a conductor 60 into an interior 24 of a tube 20, as discussed herein. In exemplary embodiments, the end portion 68 within the interior 24 may contact a grit coating 26, as discussed herein. Method 100 may further include, such as in some embodiments after step 110 is performed, the step 120 of inserting the tube(s) 20 (and thus in some embodiments the end portion(s) 68) into the interior 34 of a barrel 30, as discussed herein. Method 100 may further include the step 130 of providing a plurality of lobes 38, such that each lobe 38 is disposed within one of the plurality of passages 36, as discussed herein. Method 100 may further include the step 140 of inserting one or more fasteners 49, each fastener 49 being inserted through one of the plurality of passages 36 and into contact with a tube 20, as discussed herein. Method 100 may further include, such as in some embodiments after steps 110, 120, 130 and 140 are performed, the step 150 of inserting the barrel 30 into an interior 54 of an outer shell 50, as discussed herein.

Method 100 may further include, such as in exemplary embodiments after steps 110, 120, 130, 140 and 150 are performed, the step 160 of compressing the outer shell 50, barrel 30, lobes 38, tube(s) 20 and end portion(s) 68 together. Such compression in exemplary embodiments is a generally radial compression, as illustrated in FIGS. 6 and 7. FIG. 6 illustrates the components of an assembled conductor connector accessory assembly 70 before compression thereof, while FIG. 7 illustrates the components of an assembled conductor connector accessory assembly 70 after compression thereof to form the completed conductor connector accessory assembly 70. The compressive forces imparted on such components are illustrated by reference numeral 162. In exemplary embodiments, such compressive forces may be imparted by a suitable compression die. Alternatively, other suitable apparatus for imparting compressive forces may be utilized. Notably, such compression may in exemplary embodiments be performed, during step 160, multiple times with each compression occurring at a different location along a longitudinal axis of the accessory 10. Accordingly, full compression and formation of the assembly 70 may be achieved. However, advantageously, such multiple compressions are performed in a single step after all assembly steps 110, 120, 130, 140 and 150 are completed. Only such single step of compression is required for formation of a completed conductor connector accessory assembly 70 in accordance with the present disclosure. Separate additional compressive steps, such as between various other assembly steps 110, 120, 130, 140 and/or 150, are not required. Accordingly, the formation of a conductor connector accessory assembly 70 (and connection thereof of one or more conductors 60 with a conductor connector accessory 10) can be easily, efficiently and cost-effectively performed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for connecting a conductor and a conductor connector accessory, the method comprising:
   inserting an end portion of the conductor into an interior of a tube;
   inserting the tube into an interior of a barrel, the barrel defining a plurality of radial passages extending between an outer surface of the barrel and the interior of the barrel;
   providing a plurality of lobes, each of the plurality of lobes disposed within one of the plurality of passages;
   inserting the barrel into an interior of an outer shell; and
   compressing the outer shell, barrel, lobes, tube and end portion together.

2. The method of claim 1, further comprising inserting a fastener through one of the plurality of passages and into contact with the tube.

3. The method of claim 1, wherein the outer shell, lobes, and tube are formed from a first material and the barrel is formed from a second material different from the first material.

4. The method of claim 3, wherein the first material is an aluminum and the second material is a steel.

5. The method of claim 1, wherein the outer shell, lobes, and tube are formed from an aluminum.

6. The method of claim 1, wherein the barrel is formed from a steel.

7. The method of claim 1, wherein a grit coating is disposed on an inner surface of the tube defining the interior and the end portion of the conductor contacts the grit coating when the end portion of the conductor is inserted into the interior of the tube.

8. The method of claim 7, wherein the grit coating is formed from silicon carbide particles.

9. The method of claim 1, wherein the conductor is an aluminum conductor steel supported conductor.

10. The method of claim 1, wherein the conductor connector accessory is a dead end.

11. The method of claim 1, wherein the conductor connector accessory is a splice.

12. A conductor connector accessory, the conductor connector accessory assembly comprising:
    a tube comprising an interior surface defining an interior, wherein a grit coating is disposed on an inner surface of the tube;
    a barrel defining an interior and surrounding the tube, the barrel defining a plurality of radial passages extending between an outer surface of the barrel and the interior of the barrel;
    a plurality of lobes, each of the plurality of lobes disposed within one of the plurality of passages and in contact with tube; and
    an outer shell defining an interior and surrounding the barrel.

13. The conductor connector accessory of claim 12, further comprising a fastener extending through one of the plurality of passages and in contact with the tube.

14. The conductor connector accessory of claim 12, wherein the outer shell, lobes, and tube are formed from a first material and the barrel is formed from a second material different from the first material.

15. The conductor connector accessory of claim 14, wherein the first material is an aluminum and the second material is a steel.

16. The conductor connector accessory of claim 12, wherein each of the plurality of lobes has a wedge-shaped cross-sectional profile.

17. The conductor connector accessory of claim 12, wherein the barrel is a component of a dead end core, the dead end core comprising the barrel, a corrugated portion, and an eye.

18. The conductor connector accessory of claim 12, wherein the conductor connector accessory is a dead end.

19. The conductor connector accessory of claim 12, wherein the conductor connector accessory is a splice.

* * * * *